June 8, 1965  B. W. HARITONOFF  3,187,445
DEVICE FOR GRADING TEST PAPERS
Filed Feb. 16, 1962  3 Sheets-Sheet 1

INVENTOR.
BORIS W. HARITONOFF
BY
Attorney

June 8, 1965   B. W. HARITONOFF   3,187,445
DEVICE FOR GRADING TEST PAPERS
Filed Feb. 16, 1962   3 Sheets-Sheet 2

INVENTOR.
BORIS W. HARITONOFF
BY
Attorney

June 8, 1965  B. W. HARITONOFF  3,187,445
DEVICE FOR GRADING TEST PAPERS
Filed Feb. 16, 1962  3 Sheets-Sheet 3

INVENTOR.
BORIS W. HARITONOFF
BY
Attorney

United States Patent Office 3,187,445
Patented June 8, 1965

3,187,445
DEVICE FOR GRADING TEST PAPERS
Boris W. Haritonoff, Geneseo, N.Y., assignor to Electro-Networks, Inc., Caledonia, N.Y., a corporation of New York
Filed Feb. 16, 1962, Ser. No. 173,764
4 Claims. (Cl. 35—48)

The present invention relates to equipment for grading or marking papers on which the selected answers to a series of questions have been indicated. In a more specific aspect, the invention relates to apparatus for use by a teacher in checking test papers to ascertain the correctness of the answers given by his or her pupils to a series of questions where the pupil is given a choice of a number of possible answers to each question.

With the heavy load on teachers today, it is desirable to provide means for lessening the burden of marking the papers of a class after a test or examination. For this reason it is a common practice in devising test papers to give the pupil a choice of several different answers to each question; and all that the pupil has to do is to indicate on the test paper his choice of what he believes the correct answer to be to each question. This saves the pupil's time, enables more questions to be asked, thus amplifying the possible scope of the test, and simplifies the teacher's problem in grading or marking the paper.

To further simplify the matter of answering the questions papers are now provided on which as many spaces are provided as there are possible answers given in the test paper to each question; and the pupil simply takes his or her pencil and fills in the spaces corresponding to the selected answer for the several questions. This takes but a few seconds; and the teacher glancing down the paper can check quickly whether the selected answers are right or not, and mark the pupil accordingly. Even so, the grading of the papers of a class of pupils takes time; and in checking the pencilled spaces the teacher is liable to make mistakes, particularly if there are a large number of papers to be checked; and the teacher gets tired. It is to the grading of this class of test paper that the present invention is specifically addressed.

A primary object of the present invention is to provide a device which will permit of automatically grading papers more quickly and easily than has been possible with past practice, and in a minimum of time.

Another object of the invention is to provide apparatus for automatically grading test papers with increased accuracy.

A further object of the invention is to provide apparatus which will enable the teacher to check the answers to all of the questions on a test paper simultaneously, and which will permit the teacher to see at a single glance and visually what questions have been answered rightly and what have been answered wrongly.

Another object of the invention is to provide apparatus of the character described which can readily be set up by a teacher for grading all of the papers of a given test successively and automatically.

Other objects of the invention will be apparent hereinafter from the specification and from the recital of the appended claims.

Figure 1:
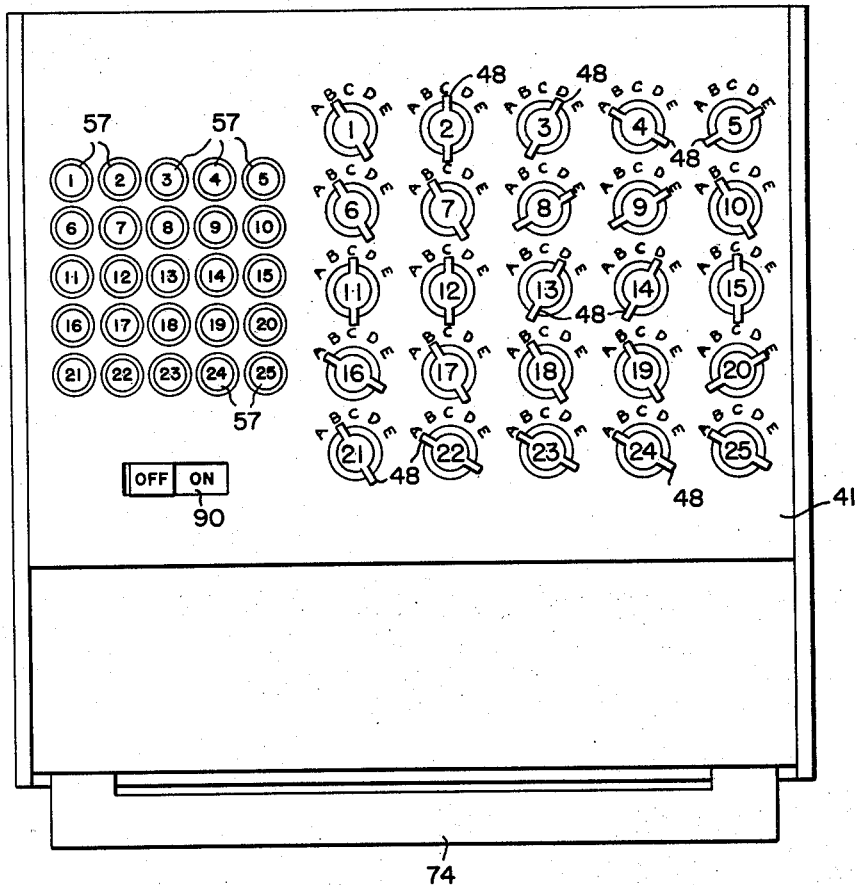
FIG. 1 is a plan view of apparatus built according to one embodiment of the present invention.

In the apparatus shown in the drawings there are a plurality of switches, or groups of switches, equal in number at least to the number of questions on the test paper and there are an equal number of signal lights. To use the machine the teacher adjusts each switch to a position determined by the correct choice of the plurality of possible answers to the corresponding test question, or if groups of switches are used, the teacher adjusts the switch or switches of the group, which corresponds or correspond to the correct choice or choices of the several possible answers offered to the corresponding test question. The pupil will have, of course, marked on his test paper what he considers is or are the proper answer or answers to each of the several test questions, by pencilling in the spaces on the test paper which correspond to his choices of answers to the questions. After setting all of the switches, the teacher feeds one test paper at a time into the marking machine. Where the correct choice of answer to a question has been made the graphite of the pencilled space of the test paper will register with electrical conductors on the machine and complete a circuit which will short out the lamp corresponding to that particular answer. If an incorrect choice of answer has been made the pencilled area of the test paper will not register with the conductor; no "shorting" circuit will be completed; and the lamp will continue to glow. Thus, a check of all of the answers on the test paper can be made simultaneously; and a check of the correctness of the answers can be made simply by glancing at the lights to see which lights remain on, and which have been extinguished. If all the lights have been extinguished by a particular test paper, that paper is one hundred percent correct. If a light remains on the answer to the question denoted by that light is incorrect. Where a multiple choice is correct for a series of questions, the machine shown in FIGS. 5 to 7 inclusive should be used.

Figure 2:
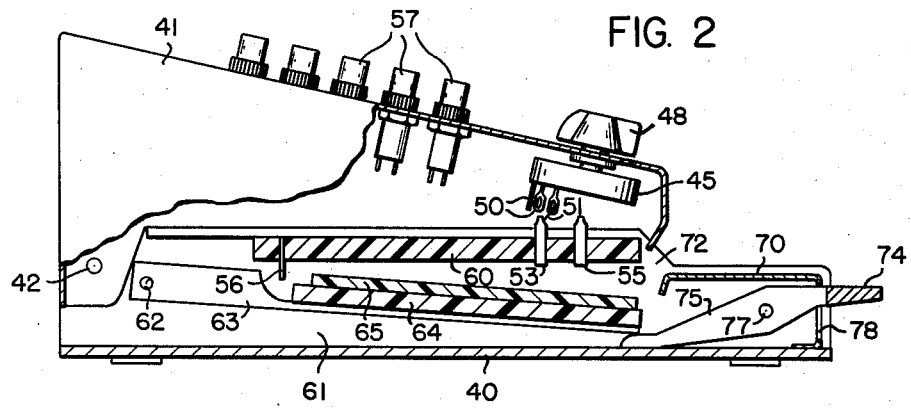
FIG. 2 is a part side elevation, part vertical sectional view of this apparatus.
Figure 3:
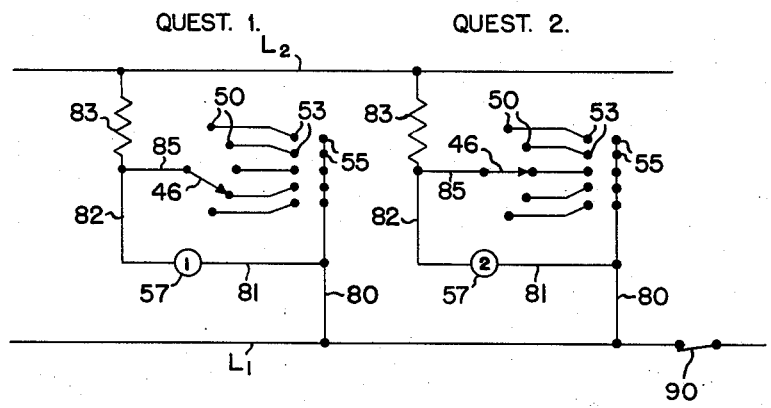
FIG. 3 is a fragmentary electrical diagram showing how this embodiment of the invention may be wired.

Referring now to the drawings by numerals of reference, and first to the embodiment of the invention illustrated in FIGS. 1 to 3 inclusive, 40 denotes the base of the device and 41 indicates a cover pivotally connected to the base by means of a hinge 42.

Figure 4:
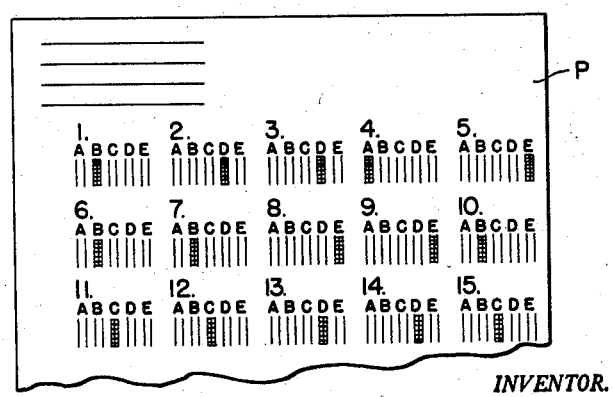
FIG. 4 is a fragmentary view of a paper such as may be graded in the apparatus shown.

The machine is intended to grade papers, such as shown fragmentarily at P in FIG. 4. The fragment of paper shown has space for answering fifteen test questions; where there are five possible answers to each question. The numerals 1, 2, 3, etc. on the paper P correspond to the numbers of the questions on the test paper. The letters "A," "B," "C," "D," and "E," under each of the numerals 1, 2, 3, etc., correspond to the five possible choices of answer from which the pupil may select what he or she considers the correct answer to a particular question. Each letter denotes a space bounded by parallel lines. The pupil having chosen the answer, which he or she thinks is correct to a particular question, fills in with his or her pencil the space under the indicia "A," "B," etc. corresponding to the selected answer for the particular question 1, or 2, or 3, etc. Thus, in FIG. 4, the paper P shown has the second choice, "B," selected as the proper answer to question 1, the space under indicium "B" under heading 1 being filled in. Similarly the fourth choice, "D," has been selected as the proper answer to question 2, the fourth choice, "D," has been selected as the proper answer to question 3, and the first choice "A" has been selected as the proper answer to question 4, etc. For clarity the spaces filled in are indicated by columnar square hatching.

Mounted in the cover 41 are a plurality of conventional rotary switches 45 (FIG. 2). There are at least as many switches as there are questions on the test paper P to be answered. Thus, if there are twenty questions on the test paper, which is to be graded by the machine of the present application, there must be at least twenty switches 45 in the cover 41 in order to achieve maximum efficiency in the operation of the machine.

The several switches shown in FIG. 1 are numbered 1 to 25 inclusive, corresponding to the numbers of the questions on the test paper. Thus, the machine shown is constructed to check simultaneously the answers to twenty-five questions. Each switch 45 has a switch blade 46 (FIG. 3) that is rotatably adjustable by means of a knob 48 (FIGS. 1 and 2) to five different positions to bring the blade 46 into contact selectively with one of the five terminals 50 of the switch. The five positions of each switch are labeled "A," "B," "C," "D," and "E," respectively, in correspondence to the five possible answers for each question.

Each terminal 50 extends outside the switch itself and is connected to a tubular electrical terminal 53 by a wire or other suitable electrical conductor 51, only one of which is shown in FIG. 2.

Each terminal 53 is secured in an insulating board 60 which is mounted between the side walls 61 of the machine in spaced relation above the machine base 40. Mounted also in the insulating board 60 are other tubular terminals 55.

There are as many terminals 53 and 55 as there are possible answers to the questions on the examination sheet. Thus, in the instance shown, there is a group of five terminals 53 and a group of five terminals 55 associated with each of the switches 45. The terminals 55 of each group are arranged in spaced relation to the terminals 53 of that group and along a line parallel to a line containing the terminals 53 of the group as illustrated in FIG. 3.

Associated with each switch 45 is a neon light 57. The lights are numbered 1 to 25, respectively, in FIG. 1 in correspondence with the numbering of the switches 45 with which the several lights are, respectively, associated. Each light is wired in circuit with its switch and to be normally illuminated, as will be described further hereinafter.

Pivotally mounted on a hinge pin 62 between the side walls 61 of the base is a plate 63 on which there is mounted an insulating sheet 64 on the top of which there is secured a rubber or other resilient pad 65.

Between the side walls of the machine and in front of the cover 41 there is provided a shelf 70. The papers P, which are to be graded, are fed over this shelf through the mouth or opening 72 between the inner end of the shelf and the lower front end of the cover 41, onto the pad 65. Pivotally mounted at 77 between the side walls 61 of the machine is a U-shaped lever 75 whose front operating end projects outwardly through an opening 78 in the front wall of the base of the machine. The inner or rear end of the lever 75 engages under the plate 63, as shown in FIG. 2. When the front end 74 of the lever is depressed, then, it will bring the paper, which is on the pad 65, up into engagement with the tubular contacts 53 and 55. If the correct choice of answer has been made to a particular question, the graphite of the line pencilled in the chosen space on sheet P will bridge across the associated contacts 53 and 55 and close an electrical circuit between these contacts 53 and 55, and this will, in the embodiment of the invention shown, turn off the neon light 57 corresponding to that question, showing the teacher that the correct answer has been selected from the group of possible answers to that question.

One way in which the machine may be wired to accomplish its purpose is illustrated in FIG. 3. Here the main lines are denoted at $L_1$ and $L_2$. Each neon lamp 57 is normally lighted through a circuit comprising the line $L_1$, the lines 80, 81, 82, the balancing resistor 83, and the line $L_2$. When a correct answer to a question has been given by pencilling in the space corresponding to that answer, the graphite pencilled into the space will upon registry with the selected contact 53, close the circuit between that selected contact 53 and the corresponding contact 55. This will cause a circuit to be made from the line $L_1$ through the line 80, the correct contacts 55 and 53, the graphite pencilled on the test paper, the switch blade 46, the line 85, and the resistor 83 to the main line $L_2$. This will short out the corresponding lightbulb 57, causing this bulb to go out, and showing the teacher that the correct answer has been selected. If an incorrect answer has been selected, the pencilled line will connect one of the contacts 53 and the corresponding contact 55, but no circuit will be made because the switch blade 46 is in engagement with a different contact 50. The circuit to the lamp 57 will, therefore, remain closed and the lamp will remain ignited showing that an incorrect answer has been given.

The machine shown in FIG. 1 has twenty-five knobs 48 for adjusting a corresponding number of switches 45, here denoted by the numerals 1 to 25 inclusive. For these switches the corresponding twenty-five signal lights 57 are also designated 1 to 25 inclusive. This machine can be used therefore in grading papers having answers to as many as twenty-five test questions.

In setting up the machine for grading the test papers, the teacher sets each of the several knobs 48 to a position "A," "B," "C," "D," or "E," corresponding to the space on the paper "P" which should be pencilled in by the pupil in order to designate the correct answer to the particular question. Thus in FIG. 1 the knob No. 1 is adjusted to position "B" indicating that on the paper P (FIG. 4) the space B of group No. 1 is the one which should be pencilled in order to designate the correct answer to the first question on the test paper. Similarly the knob No. 2 (FIG. 1) is adjusted to position "C" because choice C is the proper answer to question No. 2 of the test paper. Likewise the other knobs 3, 4, 5, etc are set to the positions "D," "A," "E," etc. corresponding to the correct choices of answers for questions 3, 4, 5, etc. of the test paper.

When all of the knobs have been adjusted to the correct positions by the teacher the machine is ready to grade the pupils' papers. The teacher simply feeds one paper at a time over shelf 70 (FIG. 2) through mouth 72 onto pad 65 until the paper comes up against the stop 56 which depends below insulation plate 60. The outer end 74 of lever 75 is then depressed to lift the paper up into contact with the terminals 53 and 55.

In FIG. 3 two switches are illustrated. These are switches Nos. 1 and 2 which have lamps Nos. 1 and 2 associated with them. As already stated switch No. 1 has been adjusted to its "B" position and switch No. 2 has been set to its "C" position because the "B" and "C" choices are the correct answers to the first and second questions on the test paper. If the test paper has been marked as shown in FIG. 4, then, with the space of column B of group (question) No. 1 pencilled in, and with the space of column D of group (question) No. 2 pencilled in, when this paper is fed into the machine and raised by lever 75, the pencilled area in column B under heading No. 1 of the test paper P will close a circuit through those contacts 53 and 55 of switch No. 1, which correspond to the "B" position of this switch, and thus short out light No. 1. However, the pencilled area in column D under heading No. 2 of the test paper will register with those contacts 53 and 55 of switch No. 2 which correspond to the "D" position of this switch, and not with those contacts 53 and 55 of this switch No. 2 which correspond to the "C" position of this switch. Hence lamp No. 2 will not be shorted out, but will remain lighted indicating to the teacher that the pupil has chosen the wrong answer to question No. 2.

So it will go for the other questions. By comparing the pencilled areas of the fragmentary portion of the test paper P shown in FIG. 4 with the settings of the corresponding switches in FIG. 1 it will be seen that the pupil has chosen the correct answers to questions Nos. 1, 3, 4, 5, 6, 7, 8, 9, 10, 11 12, 13, 14 and 15 but has chosen the incorrect answer to question 2. Lights Nos. 1, 3, 4, 5, 6, 7, 8, 9, 10, 11, 12, 13, 14 and 15 will therefore be extinguished when the test paper is raised into contact position in the machine but light No. 2 will remain illuminated, indicating to the teacher where the pupil has erred.

Figure 5:
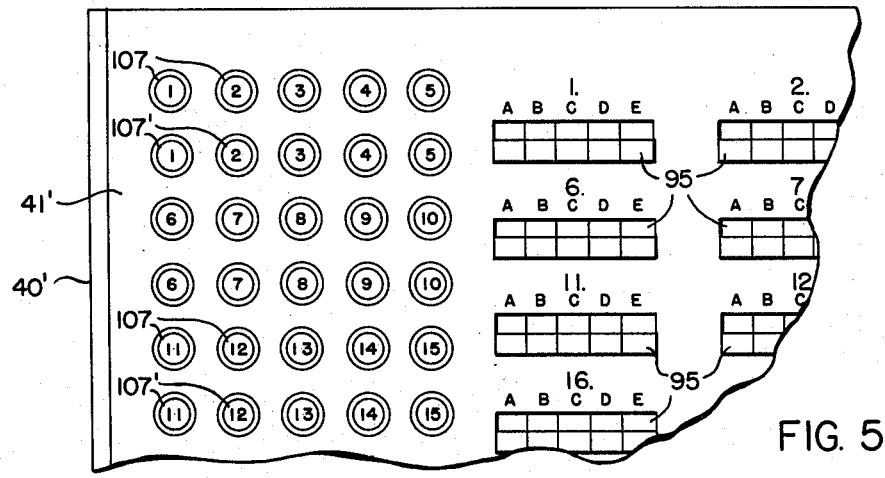
FIG. 5 is a fragmentary plan view of apparatus constructed according to a modification of the invention.
Figure 6:
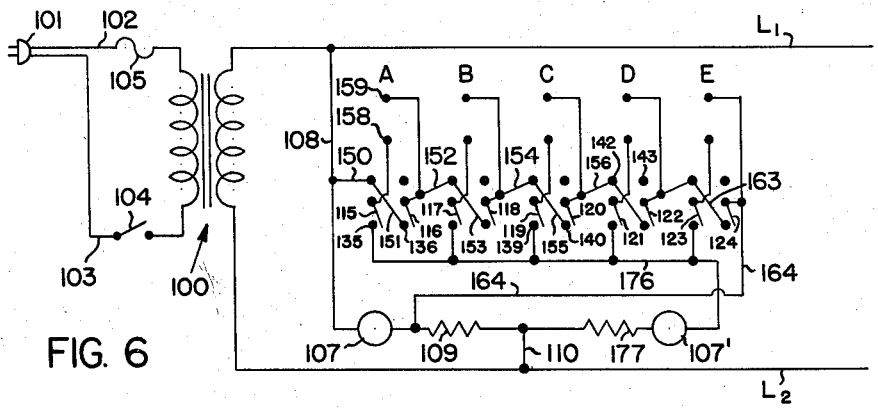
FIG. 6 is a fragmentary wiring diagram of this latter embodiment in a neutral, non-operating position.
Figure 7:
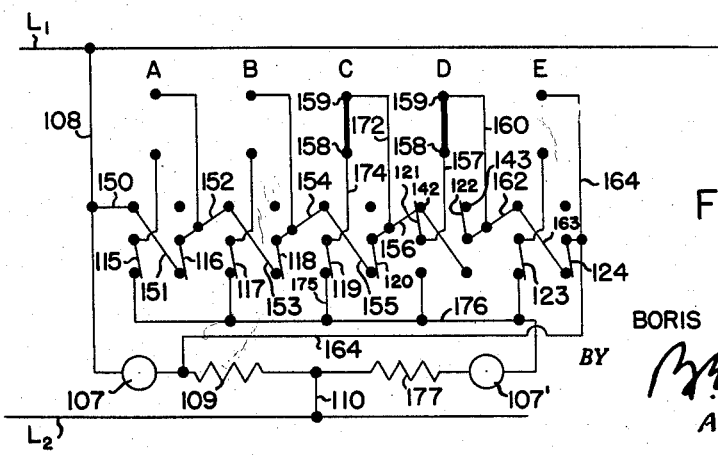
FIG. 7 is a fragmentary view of the wiring, illustrating how the device operates.

FIGS. 5, 6 and 7 show how the machine may be constructed when it is desired to mark papers where there are one or more possible correct answers to a question. Here again a set-up is illustrated providing for checking test papers where each question has five possible answers. But here for each of the questions on the test paper there is a group of switches, the groups of switches being denoted at 1, 2, 3, etc. corresponding to the numbering of the questions on the test paper. Each group of switches comprises five switches designated "A," "B," "C," "D," "E," corresponding to the five choices of answers given for each question. The switches may be sliding switches, or rotary switches. FIG. 5 is intended to show sliding switches. In this modified form of the invention, there are two lights 107, 107' for each group of switches. These are provided in order to check papers where there may be one or more possible correct answers to a question.

In order to correct the test paper, the instructor first sets the switch or switches of each group which correspond to the correct answer or answers. Then the papers are fed, as before, one after another into the apparatus.

One way in which the modified form of apparatus may be wired is shown in FIG. 6. Here the device is shown as connected through a conventional isolation transformer 100, the lines 102 and 103, and the master switch 104, and the plug 101 with a source of current. The secondary of the transformer is connected to the lines $L_1$ and $L_2$. One light 107 of each pair is ordinarily continuously illuminated, being connected by the line 108 with the line $L_1$ and through the resistance 109 and line 110 to the line $L_2$. The other light 107' is ordinarily off.

Each of the switches A, B, C, D, E of each group of switches is a double throw switch having two arms. These arms for one group of switches are denoted at 115 and 116, 117 and 118, 119 and 120, 121 and 122, 123 and 124, respectively, for positions A, B, C, D and E, respectively. These are shown in a neutral position in FIG. 6.

When papers are to be corrected, the instructor shifts the switches to an operating position. If there is only one possible correct answer to a choice of five, the instructor shifts the switch which corresponds in location to that possible answer. Thus, in FIG. 7 the switch at position D is shown as swung upwardly so that its blades 121 and 122 contact the terminals 142 and 143 respectively. If there is more than one correct answer to a question, the switches for the positions corresponding to those correct answers will be moved to the upper position, corresponding to the position of the switch arms 121 and 122 at position D. The other switches are moved to positions so that their blades have contact with the lower terminals with which they are arranged to cooperate.

Let us assume now that through error the student concludes that there are two possible correct answers to question 1, the answer in position C, and the answer in position D, whereas there is only one correct answer to this question. The instructor will already have moved the two blades of switch D to its uppermost position, since position D corresponds to the correct answer. The blades of other switches, however, will be at their lower positions as shown in FIG. 7. When the test paper is fed into the apparatus, through the opening 72 and raised to checking position, if the student has pencilled in both spaces C and D under question 1, a circuit will be made from $L_1$ through lines 108, 150 and 151, switch blade 116, line 152, line 153, switch blade 118, line 154, line 155, switch blade 120, line 156, switch blade 121, line 157, contact 158 at position D, the pencilled area in the position D on the test paper, contact 159 at position D, line 160, line 162, line 163, switch blade 124, line 164, resistor 109, and line 110 to main line $L_2$. This shorts out the light 107 so that the instructor, or the person marking the paper, sees immediately that the correct answer has been indicated in column D on the paper being corrected. However, since the student has also filled in column C under question 1 on the paper, there will also be a circuit made from line $L_1$ through line 108, line 150, line 151, switch blade 116, line 152, line 153, switch blade 118, line 154, line 155, switch blade 120, line 172, contact 159 at position C, the graphite pencilled in column C under question 1 of the paper, contact 158 at position C, the line 174, the switch blade 119, the line 175, the line 176, the light 107', the resistor 177, and the line 110 to the main line $L_2$. This causes light 107' to be illuminated to indicate an incorrect answer at position C.

It will be obvious that the paper can be corrected for any number of answers up to five for each question, the different switches being simply set to show the correct answers for the different questions.

It will thus be seen that I have provided a very simple device for checking simultaneously the answers to all of the questions on a test paper, and that through the presetting of the several switches the instructor can quickly check one paper after another of a whole class. Grading, moreover, may be done immediately by the instructor or other person, instead of sending all papers to a central point for grading, which would cause delay. Furthermore, the grading device may be used by any person, with virtually no training required.

Indication of correct answers is digital and therefore exact. Any soft graphite pencil may be used to mark the answer sheet.

It will be understood, of course, that while the device has been described for use by teachers in correcting the test papers of pupils, it is capable of use in correcting any papers where a multiple choice of answers is provided. Thus it may be used in correcting Government entrance examination papers, citizenship test papers, etc., in fact any kind of test where multiple choice of answers is given and the chosen answer or answers can be indicated on paper such as shown in FIG. 4 by pencilling in an area corresponding to the selected answer.

It will be understood, further, that while the invention has been described in connection with a machine for simultaneously checking the answers to twenty-five questions, obviously it can be built in any size to suit the convenience or needs of the user.

While the invention has been described, then, in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for grading a test paper which has a multiple choice of answers to each of a plurality of test questions, and the answers chosen are indicated by marking selected areas on the test paper with electrically-conductive material, comprising, for each question to be graded, (a) first and second electrical indicating devices, (b) a plurality of spaced terminals arranged in pairs, there being one pair of spaced terminals provided for each different answer to a question, and (c) electrical circuit means for selectively connecting said pairs of spaced terminals in circuit with said indicating devices, comprising (d) a switch associated with each pair of terminals and movable to a first position in which it partially closes an electric circuit to one of said indicating devices, and movable to a second position in which it partially closes an electric circuit shorting out the other indicating device, (e) a support on the base for holding said test paper so that marked areas thereof register with and bridge pairs of terminals to complete the circuits partially closed by said switches, (f) said switches being operative to connect their associated pairs of terminals in series circuit with one another, when disposed in said first positions, thereby to close said circuit to said one indicating device only when all the last-named pairs of terminals are in contact with electrically-conductive material on said paper, thereby to detect correct answers for a respective question.

2. Apparatus for grading a test paper which has a multiple choice of answers to each of a plurality of test questions, comprising, for each question to be graded, (a) a pair of electrically operated indicators, (b) electrical circuit means for operating one of said indicators in response to a correct answer for a given question, and for operating simultaneously the other of the indicators in response to an incorrect answer for said given question, said circuit means comprising (c) a plurality of pairs of spaced terminals, there being one pair of terminals for each possible answer to said given question, (d) a switch associated with each pair of terminals and movable selectively to a first position in which it partially connects the associated pair of terminals in circuit with said one indicator, and movable to a second position in which it partially connects the associated pair of terminals in circuit with said other indicator, (e) means for supporting a marked test paper in position so that each marked area thereof registers with one of said pairs of terminals, each of said marked areas being operative to connect the registering pair of terminals electrically with one another, and (f) said switches being operative, when more than one thereof is disposed in said first position, to connect the pairs of terminals associated therewith in series with said one indicator.

3. Apparatus for grading a test paper which has a multiple choice of answers to each of a plurality of test questions, and the answers chosen are indicated by marking selected areas on the test paper with electrically-conductive material, said apparatus comprising (a) a support, (b) a first electrically-operated indicator and a second electrically-operated indicator mounted on said support for each of the test questions, (c) first circuit means connecting each of the first indicators to a source of electrical power for activating each such first indicator, (d) a second, normally-open circuit means associated with each of the second indicators and operative, upon being closed, to activate each said second indicator, (e) a third normally-open circuit means associated with each said first indicator and operative, when closed, to short out the corresponding first circuit means to deactivate the corresponding first indicator, (f) each said second and third circuit means comprising a plurality of pairs of spaced electrical terminals, and a plurality of switches, there being a pair of terminals and an associated switch for each possible answer to each question on the test paper, each of said switches being shiftable between a first position corresponding to a correct answer and a second position corresponding to an incorrect answer, the two terminals of each pair being spaced to be connectable by a marked area on the test paper, means for supporting a marked test paper in position so that each marked area thereof will bridge a pair of terminals, whereby when a switch is in its first position and its pair of associated terminals are connected by a marked area of the test paper, said third circuit means is closed, and when a switch is in its second position and its associated pair of terminals are connected by a marked area of the test paper, said second circuit means is closed.

4. Apparatus for grading a test paper which has a multiple choice of answers to each of a plurality of test questions, and the answers chosen are indicated by marking selected areas on the test paper with electrically-conductive material, comprising (a) a base, (b) a pair of lights mounted on said base for each of said test questions, (c) a first circuit normally connecting one light of each pair to a power source to be illuminated thereby, (d) a normally-open second circuit adapted to be closed to illuminate the other light of each pair upon selection of a wrong answer to the associated question, (e) a third normally-open circuit for shorting out said first circuit and extinguishing said one light upon selection of the correct answer to the associated question, (f) a plurality of switches movably mounted on said base, there being one switch for each possible answer to a given question, (g) a pair of spaced electrical terminals associated with each of said switches, each of said switches being movable between a first position in which it partially closes said second circuit through one of its associated pair of terminals and a second position in which it partially closes said third circuit through one of the associated pair of terminals, and (h) a support member on said base for holding marked areas of a test paper in registry with and bridging said pairs of terminals, whereby if a marked area is positioned to electrically connect a pair of spaced terminals and the associated switch is in its first position, said second circuit is closed to illuminate the associated said other light, and if the marked area is positioned to electrically connect a pair of spaced terminals and the associated switch is in its second position, said third circuit is closed to short out said first circuit and extinguish the associated said one light.

References Cited by the Examiner
UNITED STATES PATENTS

| | | | |
|---|---|---|---|
| 1,997,178 | 4/35 | Johnson | 35—48 |
| 2,353,061 | 7/44 | Oldenboom | 339—18 |
| 2,598,155 | 5/52 | Betts | 35—48 |
| 2,654,163 | 10/53 | Reynolds | 35—48 |
| 2,964,374 | 12/60 | Miller. | |
| 2,970,386 | 2/61 | Knutson | 35—9.1 |

JEROME SCHNALL, *Primary Examiner.*

L. SMILOW, GEORGE A. NINAS, Jr., *Examiners.*